United States Patent [19]

Schmidt

[11] Patent Number: 4,481,658
[45] Date of Patent: Nov. 6, 1984

[54] FM-BROADCASTING SYSTEM WITH TRANSMITTER IDENTIFICATION BY BINARY PHASE-MODULATED, DIFFERENTIALLY CODED CODE SIGNAL

[75] Inventor: Johan M. Schmidt, Eindhoven, Netherlands

[73] Assignee: U.S. Philips Corp., New York, N.Y.

[21] Appl. No.: 378,571

[22] Filed: May 17, 1982

[30] Foreign Application Priority Data

May 27, 1981 [NL] Netherlands .................... 8102593

[51] Int. Cl.³ ............................................ H04H 5/00
[52] U.S. Cl. ......................................... 381/14; 381/7
[58] Field of Search .................. 179/1 GD, 1 GN; 370/69.1, 74, 76; 375/81, 84; 381/1–4, 7, 10, 13, 14

[56] References Cited

U.S. PATENT DOCUMENTS 4,246,440  1/1981  Van Der Heide et al. .... 179/1 GD
4,252,995  2/1981  Schmidt et al. ................ 179/1 GD

OTHER PUBLICATIONS

Gielis et al., "Station and Programme Identification in FM Sound Broadcasting", Philips Technical Review 39, No. 8, 1980, pp. 216–225, S20340005, 370–376.

Primary Examiner—A. D. Pellinen

Attorney, Agent, or Firm—Thomas A. Briody; William J. Streeter; Charles E. Quarton

[57] ABSTRACT

FM-broadcasting system comprising a FM-transmitter (1–16, 32–34) and a receiver (14–31, 35, 36) cooperating therewith, the transmission signal of which comprises a multiplex signal which is frequency-modulated on a main carrier wave, which multiplex signal comprises an audio-frequency information signal (L+R) and, in the case of a stereo transmission, a stereo information signal (L−R) modulated on a (38 kC) suppressed stereo subcarrier wave, also comprising a (19 kC) stereo pilot which is situated between the frequency spectra of the two information signals and a binary, differentially coded code signal which is phase-modulated on a (16.625 kC) code subcarrier wave which is situated outside the frequency spectra, and does not coincide with the (19 kC) stereo pilot, the receiver (14–31, 35, 36) comprising a pilot regeneration circuit (22–25) for regenerating the (19 kC) stereo pilot, the code signal having a bit repetition period which is an integral number of times the period of the (19 kC) stereo pilot. The signal delay ($\tau$) required for differentially decoding the code signal is stabilized by a clock signal derived from the (19 kC) stereo pilot, use then being made of the fixed frequency relationship between the bit frequency of the code signal and the stereo pilot frequency, so that disturbances due to variations in the signal delay are avoided.

6 Claims, 8 Drawing Figures

FM-BROADCASTING SYSTEM WITH TRANSMITTER IDENTIFICATION BY BINARY PHASE-MODULATED, DIFFERENTIALLY CODED CODE SIGNAL

BACKGROUND OF THE INVENTION

The invention relates to an FM-broadcasting system incorporating an FM transmitter and an FM-receiver cooperating therewith, the transmitter signal comprising a multiplex signal which is frequency-modulated on a main carrier which multiplex signal comprises an audio-frequency information signal and, in the case of a stereo transmission, a stereo information signal modulated on a suppressed stereo subcarrier, as well as a stereo pilot whose frequency is situated between the frequency spectra of the two information signals and a binary, differentially coded code signal which is phase-modulated on a code subcarrier situated outside said frequency spectra.

The invention also relates to a receiver for use in such an FM-broadcasting system.

An FM-broadcasting system of the above-described type is known from Netherlands Patent Application No. 7800581 which has been laid open to public inspection. In this known FM broadcasting system binary information is transmitted with the aid of the code signal for an easily recognizable transmitter identification. This transmitter identification may consist of an identification of the FM-transmitter to which the tuner is tuned and/or the program transmitted by the transmitter.

The receiver for this known FM-broadcasting system comprises a code signal demodulator for a phase-demodulation of the modulated code signal and a decoding circuit connected thereto which decodes the binary signal and employs it usefully, for example for a full or partial optical display of the transmitted binary information. The use of a differential code for the binary transmitter identification information to be transmitted then eliminates the phase duplicity caused during the demodulation procedure.

As is known, during the decoding of a binary differentially coded signal, such as the code signal, a comparison takes place of the instantaneous value of the binary signal with the value the binary signal had one bit repetition period prior thereto. In order to enable such a signal comparison, the decoding circuit of the said receiver must delay the code signal for exactly one bit repetition period. In the case of deviations in said delay time, for example due to temperature variations, ageing etc. faulty decodings occur, which manifest themselves in a faulty display of the transmitted transmitter identification information.

SUMMARY OF THE INVENTION

It is an object of the invention to provide an FM broadcasting system of the type described in the opening paragraph, wherein an accurate delay of the code signal in the decoding circuit of the receiver is possible by means of simple and cheap circuits.

According to the invention, an FM broadcasting system of this type is characterized in that the code signal has a bit repetition period which is an integral number of times the period of the stereo pilot.

When this measure is used, the bit repetition or clock frequency of the code signal has a fixed relationship to the stereo pilot frequency. In combination with the differential coding of the code signal the possibility is created to use said fixed frequency relationship to advantage in the receiver to obtain an accurate decoding of the code signal. In accordance with the invention this is achieved by controlling the delay necessary for decoding by a control signal derived from the stereo pilot.

A receiver for use in such FM broadcasting system is therefore characterized by a pilot regeneration circuit for regenerating the stereo pilot, a decoding circuit connected to an output of the frequency detector for differentially decoding the code signals, the decoding circuit incorporating a comparison circuit having first and second inputs, the code signal being applied to said first input and the code signal which was delayed for one bit repetition period in a clock-controlled delay circuit being applied to said second input, a clock input of the delay circuit being connected to an output of the pilot regeneration circuit.

The fixed frequency relationship ensures, as regards the bit repetition period of the code signal, an accurate, stable temperature-insensitive time delay, so that circumstances such as, for example, temperature variations or ageing do not affect the correct decoding and costly and complicated compensation circuits such as described, for example, in the U.S. Pat. No. 3,911,219 can be dispensed with.

As the amplitude of the stereo pilot in the transmitted multiplex signal is many times greater than the amplitude of the code subcarrier the control of the delay of the code signal in the decoding circuit of the receiver in accordance with the invention is insensitive to a very high extent to disturbances which may be producing during the signal transmission.

The measure of relating the bit repetition frequency of the code signal in the transmitter to the stereo pilot frequency is known per se from the publication "The SPI system for FM tuning", published by N. V. Philips, Electronic Components and Materials Division, in 1978. However, in said publication the code signal is not differentially coded, while in the receiver said frequency relationship for the actual decoding of the code signal is not used.

A preferred embodiment of the last-mentioned receiver is characterized in that the code signal applied to the comparison circuit of the decoding circuit is phase-modulated on a carrier wave having an auxiliary intermediate frequency which is at least equal to the frequency difference between the code subcarrier wave and the stereo pilot or a harmonic thereof.

This measure if known per se from U.S. Pat. No. 3,911,219. When this measure is used in the receiver in accordance with the invention the special advantage is obtained that a narrow-band, slow phase control loop, as required in the receiver of the prior art FM-broadcasting system can be dispensed with for the regeneration of the said carrier wave, so that a very fast decoding of the coding signal is possible. This measure furthermore simplifies the circuit considerably.

A further preferred embodiment of such a receiver is characterized in that between the pilot regeneration circuit and a clock input of the delay circuit means are connected for applying a clock signal to the delay circuit with a clock frequency of at least twice the auxiliary intermediate frequency, said delay circuit comprising a shift register having a number of cascaded clock-controlled storage elements, which number is at least equal to the quotient of the clock frequency and the bit repetition of the code signal and the decoding circuit being connected to a low-pass filter for a selection of the decoded code signal.

When this measure is used, a continuous signal comparison is performed every half cycle of the said carrier wave and decoding errors due to phase disturbances in the received code signal are suppressed in the low-pass filter.

A still further preferred embodiment of said receiver is characterized in that between the frequency detector and the decoding circuit a mixing stage is connected for converting the frequency of the code subcarrier wave into an auxiliary intermediate frequency which is equal to the frequency difference between the code subcarrier wave and the stereo pilot or a harmonic thereof and the clock frequency is equal to an integral number of times the stereo pilot frequency in the multiplex signal.

When this measure is used, a simple selection of the modulated code signal from the multiplex signal is possible on the one hand, and on the other hand the generation of the clock signal and the generation of the mixing signal for the frequency conversion can be derived in a simple way from the regenerated stereo pilot.

The invention will now be further described by way of example with reference to the Figures shown in the accompanying drawings.

DESCRIPTION OF THE PREFERRED EMBODIMENTS

Figure 1:
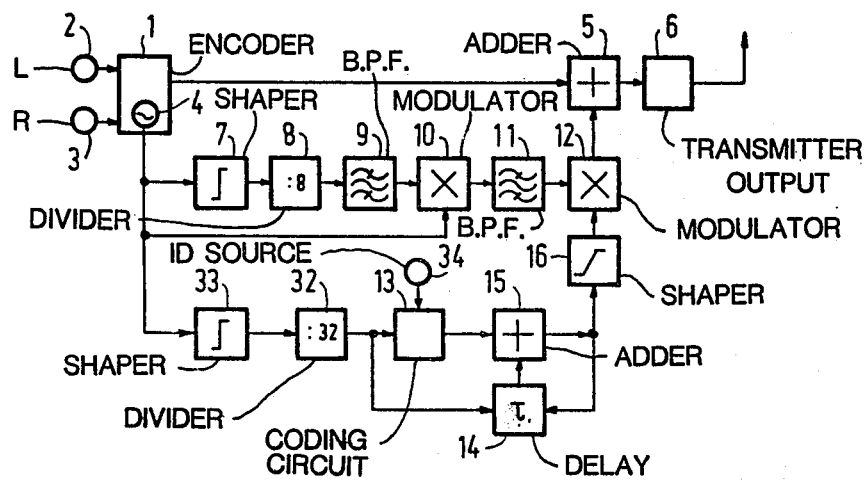
FIG. 1 shows a transmitter for use in an FM broadcasting system in accordance with the invention.

The transmitter shown in FIG. 1 comprises a stereo multiplex encoder 1, to which sources 2 and 3 of left-hand and right-hand audio signals, respectively are connected, which encoder comprises a 19 kHz oscillator 4, which produces a 19 kHz stereo pilot. The encoder 1 assembles in known manner from the signals applied to it the standard multiplex signal whcih contains the audio-frequency sum signal L+R, the L−R stereo information signal modulated on a suppressed stereo subcarrier wave of twice the pilot frequency, as well as the stereo pilot itself. Said standard multiplex signal is applied to a first input of an adder stage 5.

The stereo pilot produced by the oscillator 4 is applied to a pulse shaper 7 and to a frequency divider 8, which produces a square-wave signal of $\frac{1}{8} \times$ the stereo pilot frequency (2.375 kHz). A bandpass filter 9 tuned to this frequency selects the fundamental frequency therefrom, so that a sinusoidal signal of $\frac{1}{8} \times$ the pilot frequency is available on a first input of a modulator 10. The stereo pilot produced by the oscillator 4 is also applied to a second input of the modulator 10. The modulator 10 is a linear balanced modulator which produces the sum and difference frequencies $\frac{7}{8}$ and $9/8 \times$ the pilot frequency, respectively from the two applied sinusoidal signals. The difference frequency is selected therefrom with the aid of a bandpass filter 11 tuned to said frequency, which frequency functions as a carrier wave for the binary code signal. This wave, which is commonly referred to as the code subcarrier wave is applied to a first input of a linear balanced modulator 12.

Figure 1A:
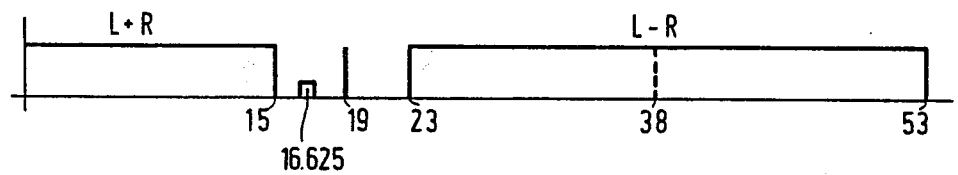
FIG. 1A shows the frequency spectrum of the multiplex signal of the transmitter shown in FIG. 1.

A second input of the balanced modulator 12 is supplied via a trapezium wave shaper 16 with the differentially coded code signal to be transmitted, which is formed in the manner described hereinafter. The trapezium wave shaper 16 reduces the content of higher frequency components, so that the binary differentially coded code signal applied to the modulator 12 encompasses a limited frequency range (up to approximately 600 Hz). An output of the balanced modulator 12 is connected to a second input of the adder stage 5. The adder stage 5 applies a multiplex signal, the frequency spectrum of which is shown in FIG. 1A, to a transmitter output stage 6, in which the multiplex signal is frequency-modulated on a carrier wave and is thereafter transmitted, after having been amplified.

The transmitter described sofar is known from the said Netherlands Patent Application No. 7800581 which has been laid open to public inspection.

The transmitter also comprises a signal source 34 which applies the transmitter identification information to be transmitted to a clock-controlled, binary coding circuit 13. The binary coding circuit 13 forms a binary code signal which contains the transmitter identification information, having a bit frequency which is in a fixed frequency relationship with the stereo pilot frequency. To this end the oscillator 4 is connected to a clock input of the binary coding circuit 13 via a pulse-shaper 33 and a divide-by-32 divider 32, which supplies a square-wave signal of $1/32 \times$ the stereo pilot frequency (593.75 Hz).

The operation and construction of the binary coding circuit 13, and the pulse-shaper 33 and the divide-by-32 divider 32 are described in the above-mentioned publication "The SPI-system for FM-tuning". A further description of these circuits is not necessary for understanding the invention and is consequently omitted.

The binary coding circuit 13 is connected to a differential coding arrangement 14, 15, which comprises a clock-controlled delay circuit 14 and a binary adder circuit 15. The binary code signal of the coding circuit 13 is applied to a first input of the adder circuit 15. An output of the binary adder circuit 15 is connected to a signal input of the clock-controlled delay circuit 14. The code signal is submitted in the delay circuit 14 to a delay τ, which corresponds to the duration of one bit repetition period and is thereafter applied to a second input of the adder circuit 15. In the adder circuit 15 a binary addition or exclusive OR-operation is performed for each bit of the applied signals. For each bit the output signal of the adder circuit 15 indicates the least significant bit value of the binary sum of each code bit and the preceding code bit, so that, as known, the code signal has been differentially encoded.

The delay circuit 14 is clock-controlled from the divide-by-32 divider 32 and can be realized by means of an integrated circuit of the type HEF 4013. The instantaneous bit value of the code signal is entered into a single bit shift register and is not applied to the adder circuit 15 until a next clock pulse. The adder circuit 15 may be realized by means of an integrated circuit HEF 4070.

The differentially coded code signal at the output of the adder circuit 15 is thereafter applied via the trapezium wave shaper 16 to the second input of the balanced modulator 12, in which in known manner the code subcarrier wave is binary phase-modulated by the said differentially coded code signal.

Figure 2:
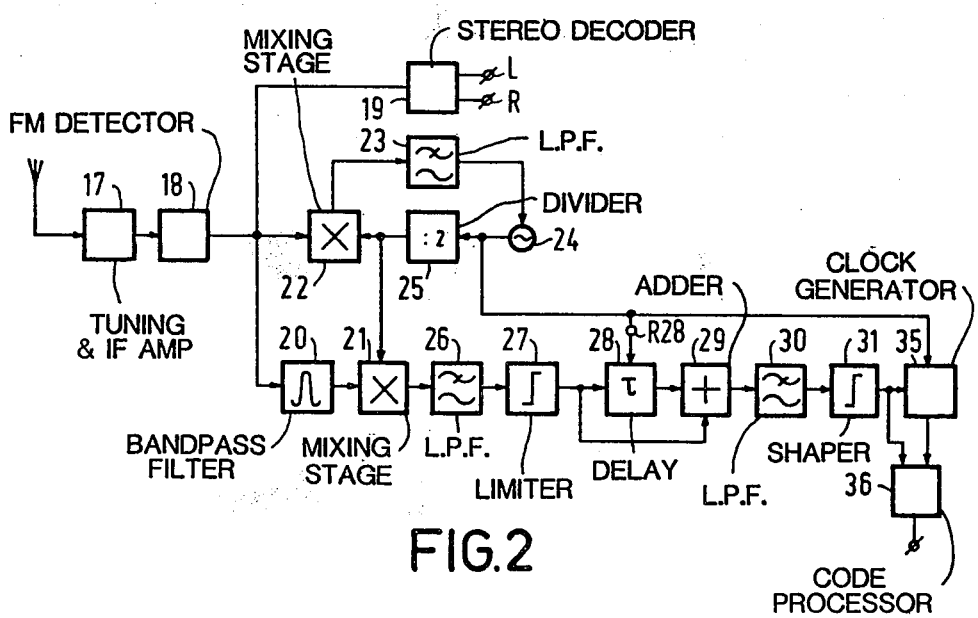
FIG. 2 shows a receiver for the reception and processing of the transmitter signal from the transmitter shown in FIG. 1.

FIG. 2 shows the block schematic circuit diagram of an FM-receiver in accordance with the invention, comprising a tuning unit/IF amplifier 17, connected to an antenna device, and a FM-detector 18. The multiplex signal which comprises the components shown in FIG. 1A is available on the output of the FM-detector 18. In the case of a stereo receiver this multiplex signal is applied to a stereo decoder 19, which supplies left-hand and right-hand audio signals on outputs L and R.

For the demodulation and decoding of the differentially coded code signal the multiplex signal is applied on the one hand to a first input of a mixing stage 21 via a bandpass filter 20 tuned to the code subcarrier frequency and on the other hand to a phase-locked loop 22-25. The phase-locked loop 22-25 is tuned to the 19 kHz stereo pilot of the multiplex signal and functions as a pilot regeneration circuit. The phase-locked loop 22-25 comprises a mixing stage 22 which is connected to the FM detector 18 via a first input and also comprises, connected to the output of said mixing stage a low-pass filter 23, a 38 kHz voltage controlled oscillator 24 and a frequency divide-by-two divider 25 in this order. The frequency divide-by-two divider 25 is connected to a second input of the mixing stage 22. The mode of operation of such a phase loop is known. The 38 kHz output signal of the voltage-controlled oscillator 24 is converted in the divide-by-two divider 25 into a 19 kHz signal, which in the mixing stage 22 which functions as a phase detector is compared with the 19 kHz stereo pilot of the multiplex signal. The output signal of the mixing stage 22 is filtered in the low-pass filter 23 and applied to the oscillator 24 as a control voltage. Thus, the 38 kHz oscillator signal and the 19 kHz output signal of the divide-by-two divider 25 are locked in a fixed phase-relationship to the 19 kHz stereo pilot of the multiplex signal. The 19 kHz stereo pilot, thus regenerated, at the output of the divide-by-two divider 25 is applied to a second input of the mixing stage 21.

As a result thereof, the differentially coded code signal is available binary phase-modulated on a carrier having an auxiliary intermediate frequency of 2.375 kHz, which differential code signal itself may, for example, have the shape shown in FIG. 4A. The 2.375 kHz carrier wave frequency corresponds to the differential frequency between the 19 kHz stereo pilot and the 16.625 kHz code subcarrier wave of the multiplex signal and is separated from the further mixing products by means of a low-pass filter 26.

The output of the low-pass filter 26 is connected to a limiter 27 which limits the amplitude of this phase-modulated 2.375 kHz carrier. This results in a phase-modulated binary signal in which the phase reversals indicate the bit value changes of the differentially coded code signal, as represented by, for example, the pulse train of FIG. 4B. At the given frequency relationships in the transmitter of the bit frequency of the code signal and the code subcarrier frequency relative to the pilot frequency, one bit period of the code signal encompasses 4 periods of the 2.375 kHz carrier.

The phase-modulated differentially-coded code signal thus obtained is thereafter applied to a differential decoding arrangement 28, 29 in which a demodulation as well as a decoding of the code signal is effected. For that purpose the code signal is applied to a first input of a binary adder circuit or exclusive OR-circuit which function as a comparison circuit 29. In said adder circuit or exclusive OR-circuit said code signal is binary added to the code signal being delayed by one code bit which delayed code signal is applied to a second input of the comparison circuit 29. For the code signal as shown in FIG. 4B such a signal delay $\tau$ results in a signal as shown in FIG. 4C. Said signal delay $\tau$ is realized with the aid of a delay circuit 28, which is clock-controlled from the pilot regeneration circuit 22-25 and is connected between the limiter 27 and the second input of the comparison circuit 29. The binary addition in the comparison circuit 29 of the instantaneous and the delayed code signals as shown in FIG. 4B and FIG. 4C, respectively, directly yields the original code signal as shown in FIG. 4D.

The demodulation and decoding of a differentially coded binary signal whose phase is modulated on an analogue carrier by means of a differential decoding circuit is known per se from the above-mentioned U.S. Pat. No. 3,911,219. In said patent specification there is, however, no predetermined frequency relationship between the bit frequency of the binary signal and the carrier wave frequency, which frequency relationship is present in the FM-broadcasting system in accordance with the invention. In the last-mentioned prior are decoding circuit the object is to reduce the noise effects due to variations in the signal delay, caused by temperature variations or ageing, by means of a complicated and costly feedback control loop.

The signal delay $\tau$ in the delay circuit of the FM-receiver in accordance with the invention is directly coupled to the bit repetition period of the code signal via the stereo pilot. To that end an output of the phase-locked loop 22-25 which functions as a pilot regeneration circuit is coupled to a clock input $R_{28}$ of the delay circuit 28. This enables a continuous adjustment of the signal delay $\tau$ to accurately one bit repetition period of the code signal, so that noise effects caused by variations in the delay time, as in the circuit described in the said U.S. Patent Specification, are fully obviated in a simple manner.

It will be obvious that the bit repetition period of the code signal and consequently the signal delay $\tau$ are not only derivable from the 19 kHz stereo pilot but also from every harmonic or subharmonic of said pilot. In the embodiment shown, the 38 kHz output signal of the voltage-controlled oscillator 24 is used as a clock signal for the delay circuit 28.

In addition, it is conceivable to effect a discontinuous decoding, not shown, by sampling in each bit repetition period of the code signal, the code signal which is modulated on a carrier with the auxiliary intermediate frequency for only half a period of the auxiliary intermediate frequency and by comparing the instantaneous signal sample with the signal sample which was delayed by one bit repetition period. The sampling or clock frequency must then be equal to the bit repetition frequency of the code signal and may, for example, be obtained by dividing the regenerated 19 kHz stereo pilot by 32.

In practice however, delay effects and/or weak signal reception cause phase errors in the received code subcarrier, as a result of which the last-mentioned discontinuous decoding becomes unreliable. Preferably, a continuous decoding is used, which means that a complete image of the modulated code signal must be stored in the delay circuit 28 within at least one bit repetition period as, for example, shown in FIG. 4B. To this end the delay circuit 28 must comprise a shift register having a number of storage elements which number is at least twice the number of periods of the auxiliary intermediate frequency carrier wave from which the code signal is modulated within one bit repetition period of the code signal. The bit values stored in the storage elements must then be shifted with a clock frequency of twice the carrier wave frequency. In this continuous decoding the phase errors manifest themselves in narrow pulse spikes in the decoded code signal at the output of the comparison circuit, which spikes recur at the bit frequency. Noise pulses of this type can be removed in a simple way by means of a low-pass filter 30, which is connected to the output of the comparison circuit 29. Said low-pass filter must only allow the decoded signal, as shown for example in FIG. 4D, to pass and has a cut-off frequency of approximately 350 Hz for that purpose.

A further reduction in the noise sensitivity of the decoding is obtained by performing a signal comparison several times in each half period of the auxiliary intermediate frequency. For this purpose the image of the said code signal in the delay circuit 28 must be stored more accurately than in the case described in the foregoing. To that end, a 64-bit shift register is used in the embodiment shown, which means, at an auxiliary intermediate frequency of 2.375 kHz that on an average 8 consecutive storage elements store the signal value for each half period of the auxiliary intermediate frequency carrier wave. This enables a more accurate averaging of phase errors than in the preceding case, in which only 1 storage element stores the signal value of half a period of the said carrier wave. Consequently, at the above-mentioned 38 kHz clock frequency a signal comparison is effected 8× in the comparison circuit 29 in each half period of the auxiliary intermediate frequency 2.375 kHz carrier wave, so that the noise pulses in the decoded code signal are of a very short duration and can consequently be suppressed to a very large extent by means of a simple low-pass filter.

After the decoded code signal has passed said low-pass filter 30, the square-wave shape of the code signal is restored, if necessary, in a pulse shaper 31 and applied to a code signal processing unit 36 in which in known manner the code signal is used as a control signal for a character generator which is connected to a picture display unit. The clock signal required during said signal processing operation is derived from the 19 kHz regenerated pilot signal by means of a clock generator 35. A more detailed description of the pulse-shaper 31, the clock generator 35 and the code signal processing unit 36 is not necessary for understanding the invention and is therefore omitted for the sake of clarity.

Figure 3:
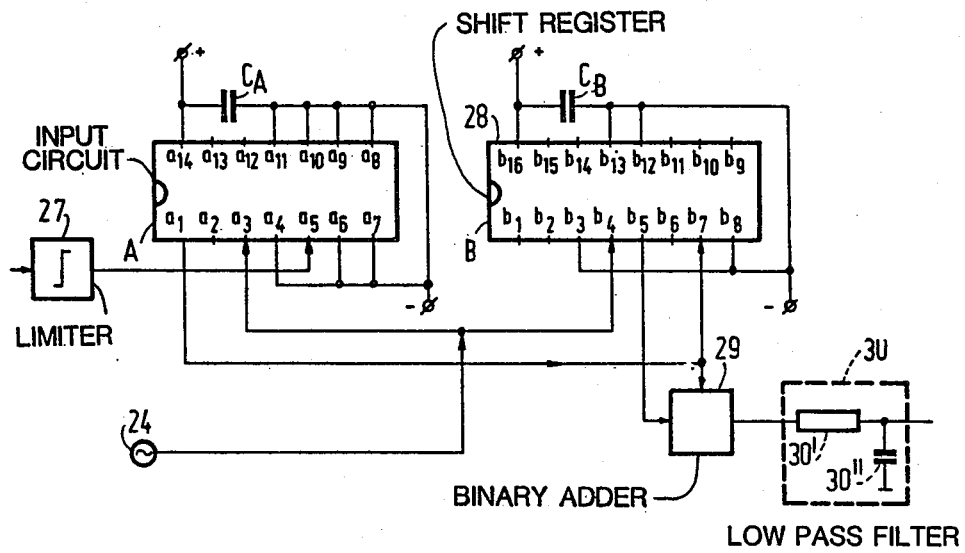
FIG. 3 shows a practical embodiment of a decoding circuit for differentially decoding the code signal.

FIG. 3 shows a practical embodiment of the decoding circuit 28, 29, the 38 kHz oscillator signal produced by the oscillator 24 being used, as mentioned above, to control the delay circuit 28.

The decoding circuit 28, 29 comprises an integrated input circuit A of the type HEF 4013, which is connected to the type HEF 4517 integrated shift register B which functions as the delay circuit 28. An output of the shift register B is coupled to an integrated exclusive OR-circuit of the type HEF 4070, which functions as the comparison circuit 29. An output of the comparison circuit 29 is connected to the low-pass filter 30. The designations used for the terminals of the circuits A and B in FIG. 3 are in conformity with the designations of the terminals shown in "Philips Data Handbook—Semiconductors and Integrated Circuits", part 6, October 1977, published by N. V. Philips' Gloeilampenfabrieken, Electronic Components and Materials Division.

The limiter 27 applies the binary phase-modulated differentially coded code signal to a signal input $a_5$ of the input circuit A. Said input circuit applies the code bits from the signal input $a_5$ via an output $a_1$ to a data input $b_7$ of the shift register B at a rate determined by the 38 kHz oscillator signal produced by the oscillator 24 and also to the first input of the comparator circuit 29. For a proper synchronization, the 38 kHz oscillator signal produced by the oscillator 24 is connected to clock inputs $a_3$ and $b_4$ of the circuits A and B.

The shift register B delays the code bits received at the data input $b_7$ for 64 periods of the 38 kHz oscillator signal or 32 periods of the regenerated 19 kHz stereo pilot. The code signal thus delayed is applied via a signal output $b_5$ to the second input of the comparison circuit 29 in which binary addition of the two code signals is effected in the above-described manner.

For a correct adjustment of the supply voltage for the circuits A and B, the terminals $a_4$ and $a_6$–$a_{11}$ as well as the terminals $b_3$, $b_8$, $b_{12}$, $b_{13}$ must be connected to a negative supply voltage of 5 V and the terminals $A_{14}$ and $b_{16}$ to a positive supply voltage 5 V. Capacitors $C_A$ and $C_B$, each having a capacitance value of 22 nF are connected between the positive and negative supply voltage terminals of the respective circuits A and B for short-circuiting pulses on the supply voltage.

The RC low-pass filter 30 incorporates a 39 kΩ series resistor 30' and a 10 nF capacitor 30" connected to ground.

Figure 4:
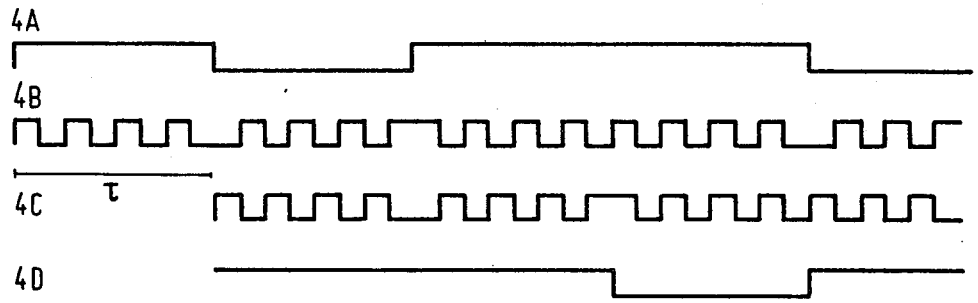
FIGS. 4A–4D show the binary, differentially coded code signal having bit values 10110 in non-modulated, phase-modulated and delayed form, respectively and the differentially decoding code signal.

The frequency conversion of the code subcarrier wave from 16.625 kHz to 2.375 kHz, on which the embodiments shown in FIG. 2 and 4 are based, is not necessary for the inventive idea, as it is very well possible to accomplish without this frequency conversion the demodulation and decoding of the differentially coded code signal which is binary phase-modulated on the 16.625 kHz code auxiliary wave by means of a decoding circuit 28, 29 which must only be adapted as regards the formation of the clock signal, which adaptation is simple for one skilled in the art.

Such a demodulation and decoding of the code signal imposes, however, special requirements as regards the frequency characteristic of the bandpass filter 20. In contrast therewith, the use of the above-mentioned frequency conversion enables an effective selection of the code signal by means of the simple low-pass filter 26.

The 19 kHz stereo pilot required for forming a clock signal may, in the case of a stereo receiver, alternatively be used in the stereo decoder.

What is claimed is:

1. A FM broadcasting system comprising an FM-transmitter and a receiver cooperating therewith, a transmitter signal comprising a multiplex signal which is frequency-modulated on a main carrier which multiplex signal comprises an audio-frequency information signal, a stereo information signal modulated on a suppressed stereo subcarrier, as well as a stereo pilot whose frequency is situated between the frequency spectra of the two information signals and a binary, differentially coded code signal which is phase-modulated on a code subcarrier situated outside said frequency spectra, characterized in that the code signal had a bit repetition period which is an integral multiple non-zero number of times the period of the stereo pilot, the period of the stereo pilot times said integral number providing control for an accurate, stable time delay source for decoding the binary, differentially coded code signal.

2. A receiver for processing a transmitted multiplex signal which is frequency-modulated on a main carrier, the multiplex signal comprising an audio-frequency information signal, a stereo information signal modulated on a suppressed stereo subcarrier, a stereo pilot having a frequency situated between the frequency spectra of the two information signals and a binary, differentially coded code signal which is phase-modulated on a code subcarrier situated outside said frequency spectra, the code signal having a bit repetition period which is an integral number of times the period of the stereo pilot, said receiver comprising a pilot regeneration circuit for regenerating the stereo pilot, a decoding circuit connected to an output of a frequency detector for differentially decoding the code signal, the decoding circuit comprising a comparison circuit having first and second inputs, the code signal being applied to said first input, and a clock-controlled delay circuit for forming a delayed code signal having a delay of one bit repetition period, said delayed code signal being applied to said second input of the comparison circuit, a clock input of the delay circuit being connected to an output of the pilot regeneration circuit.

3. A receiver as claimed in claim 2, characterized in that the code signal applied to the comparison circuit in the decoder circuit is phase-modulated on a carrier having an auxiliary intermediate frequency which is at least equal to the frequency difference between the code subcarrier wave and the stereo pilot or a harmonic thereof.

4. A receiver as claimed in claim 3, characterized in that clock means are coupled to a clock input of the delay circuit for applying a clock signal to the delay circuit with a clock frequency of at least twice the auxiliary intermediate frequency, an input of said clock means being coupled to the pilot regeneration circuit, the delay circuit comprising a shift register having a number of cascaded clock-controlled storage elements, which number is at least equal to the quotient of the clock frequency and the bit repetition frequency of the code signal and the decoding circuit being connected to a low-pass filter for a selection of the decoded code signal.

5. A receiver as claimed in claim 4, characterized in that a mixing stage is connected between the frequency detector and the decoding circuit for converting the frequency of the code subcarrier wave into an auxiliary intermediate frequency which is equal to the frequency difference between the code subcarrier wave and the stereo pilot or a harmonic thereof and the clock frequency is equal to an integral number of times the stereo pilot frequency in the multiplex signal.

6. A receiver as claimed in claim 4 or claim 5, characterized in that the low-pass filter has a cut-off frequency of at least substantially 350 Hz.

* * * * *